US007697241B2

(12) United States Patent
Pottebaum et al.

(10) Patent No.: US 7,697,241 B2
(45) Date of Patent: Apr. 13, 2010

(54) RESONANT FREQUENCY SEPARATION FOR AN ACTUATOR ASSEMBLY OF A DISC DRIVE

(75) Inventors: Kenneth L. Pottebaum, Yukon, OK (US); Svetlana I. Kovinskaya, Edmond, OK (US); John D. Stricklin, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/058,267

(22) Filed: Mar. 28, 2008

(65) Prior Publication Data

US 2008/0174917 A1   Jul. 24, 2008

Related U.S. Application Data

(63) Continuation of application No. 10/121,772, filed on Apr. 11, 2002, now abandoned.

(60) Provisional application No. 60/332,921, filed on Nov. 14, 2001.

(51) Int. Cl.
*G11B 5/48* (2006.01)

(52) U.S. Cl. .................. 360/266; 360/266.1; 360/244.5

(58) Field of Classification Search .............. 360/244.2, 360/244.5, 265.9, 266, 266.1
See application file for complete search history.

(56) References Cited

U.S. PATENT DOCUMENTS

| 4,991,045 | A  | 2/1991  | Oberg           |
|-----------|----|---------|-----------------|
| 5,014,142 | A  | 5/1991  | Nakanishi et al.|
| 5,218,496 | A  | 6/1993  | Kaczeus         |
| 5,268,805 | A  | 12/1993 | Peng et al.     |
| 5,299,082 | A  | 3/1994  | Ananth et al.   |
| 5,491,598 | A  | 2/1996  | Stricklin et al.|
| 5,808,835 | A  | 9/1998  | Fujiwara        |
| 5,828,521 | A  | 10/1998 | Hasegawa        |
| 5,953,180 | A  | 9/1999  | Frater et al.   |
| 5,956,210 | A  | 9/1999  | Kaneko          |
| 6,091,574 | A  | 7/2000  | Misso           |
| 6,163,441 | A  | 12/2000 | Wood et al.     |
| 6,215,625 | B1 | 4/2001  | Carlson         |
| 6,442,002 | B1 | 8/2002  | Pan             |
| 6,473,272 | B1 | 10/2002 | Resh et al.     |
| 6,614,626 | B2 | 9/2003  | Raphael et al.  |
| 6,751,068 | B1 | 6/2004  | Kant et al.     |

FOREIGN PATENT DOCUMENTS

WO           01/73765 A1   10/2001

*Primary Examiner*—Brian E Miller
(74) *Attorney, Agent, or Firm*—McCarthy Law Group

(57) ABSTRACT

An actuator assembly is provided that includes a body portion, a first actuator arm assembly, a second actuator arm assembly, a first flexure assembly, and a second flexure assembly. Each of the first and second actuator arm assemblies projects from the body portion and has a distal end with different respective first and second mechanical configurations, sometimes referred to herein as "mounting configurations." Each of the flexure assemblies is respectively mounted to the distal ends of the first and second actuator arm assemblies via the respective mounting configuration. The first and second mechanical configurations (mounting configurations) are selected to provide the first and second flexure assemblies with different mechanical resonance characteristics. In a preferred embodiment, the second actuator arm assembly includes an actuator arm and a spacer disposed between the actuator arm and the second flexure assembly. The spacer has a stiffness different from the stiffness of the actuator arm.

16 Claims, 6 Drawing Sheets

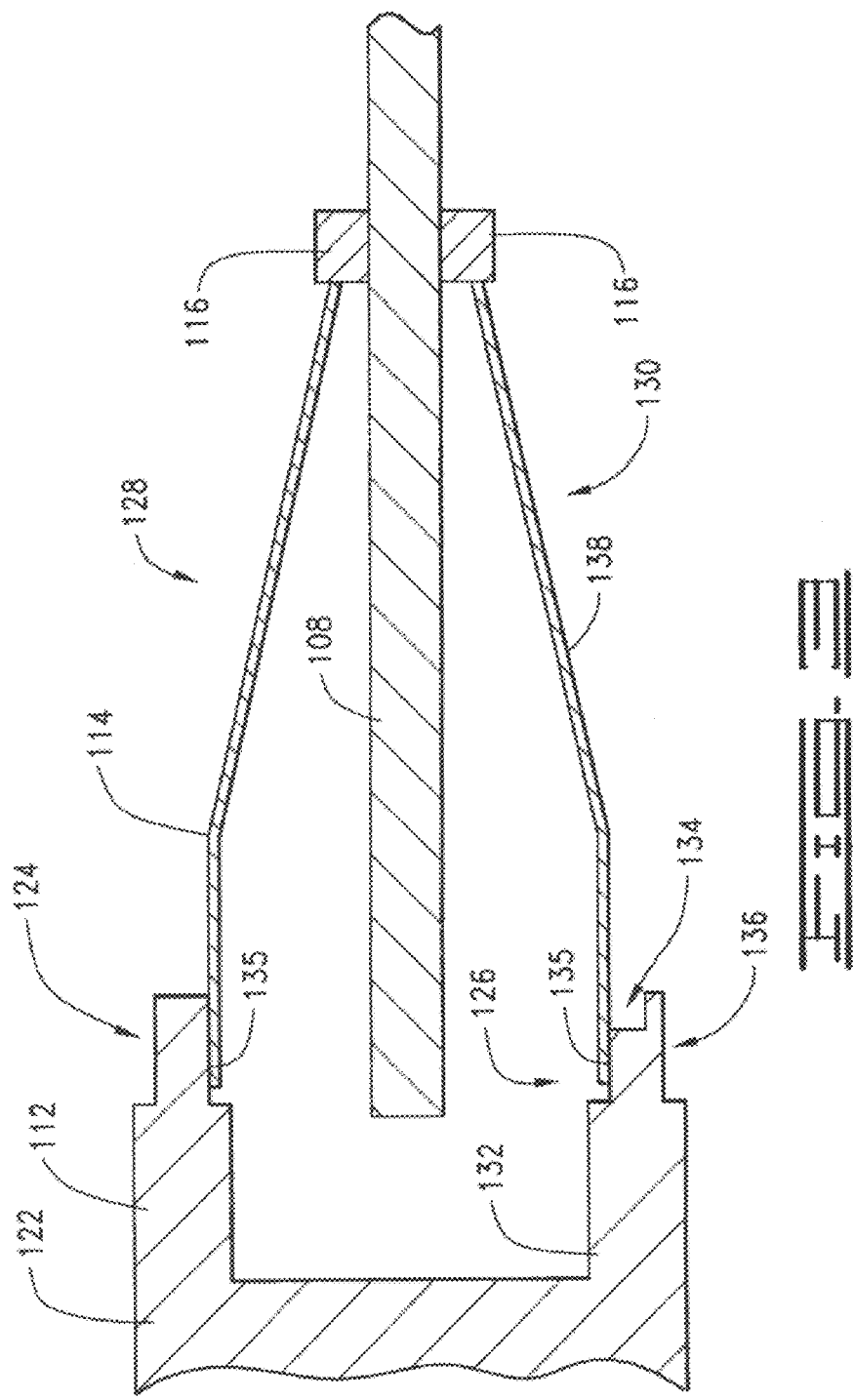

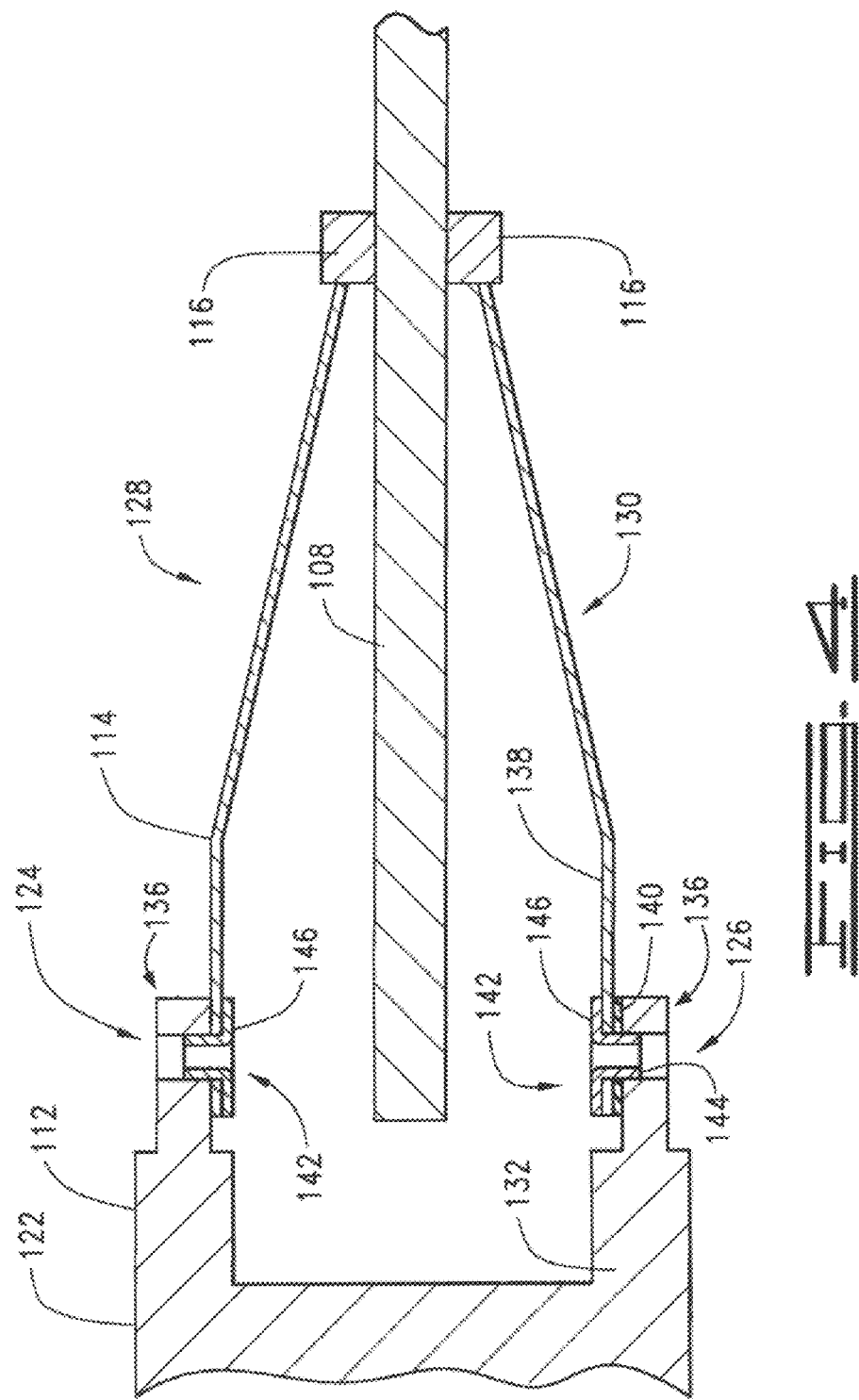

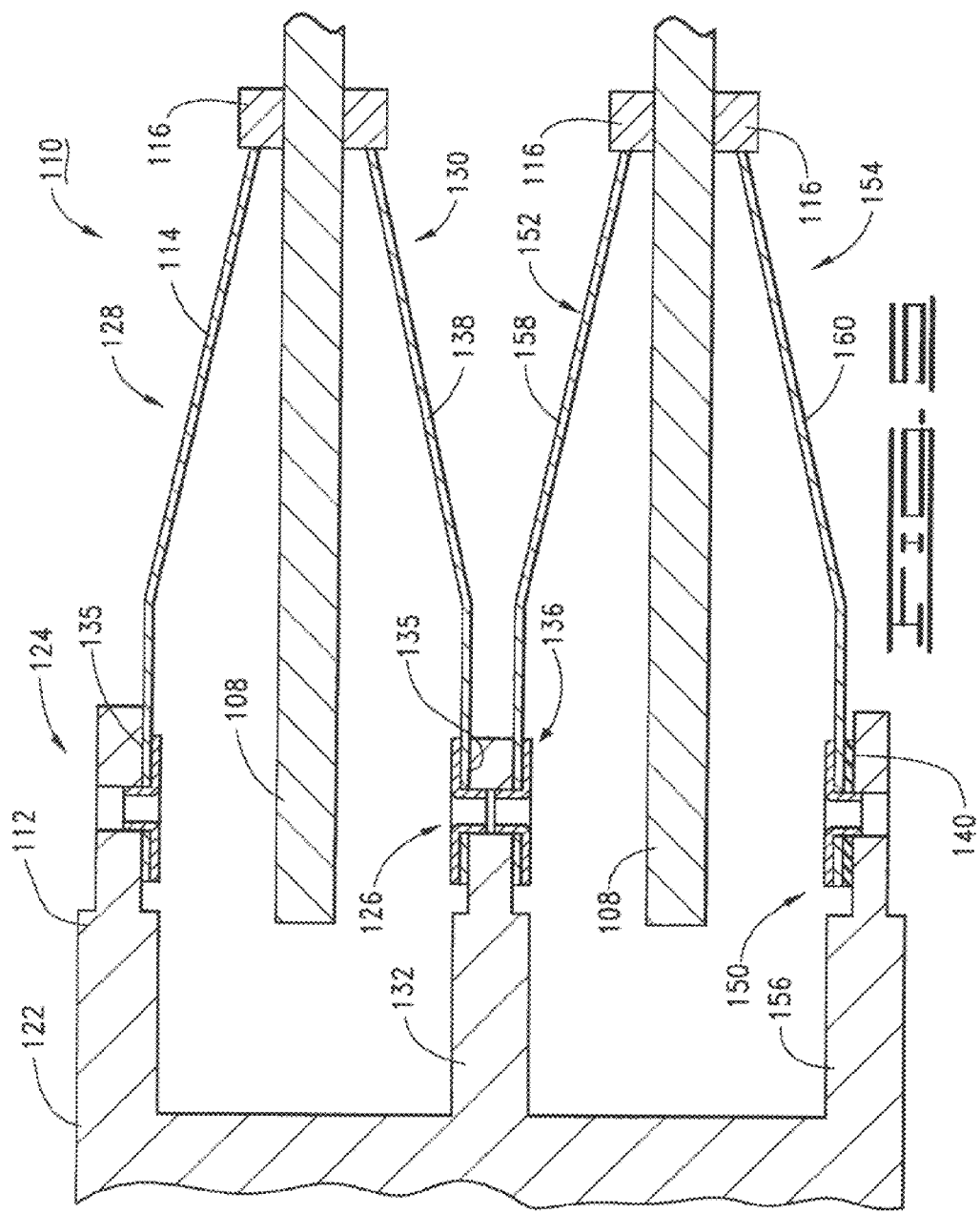

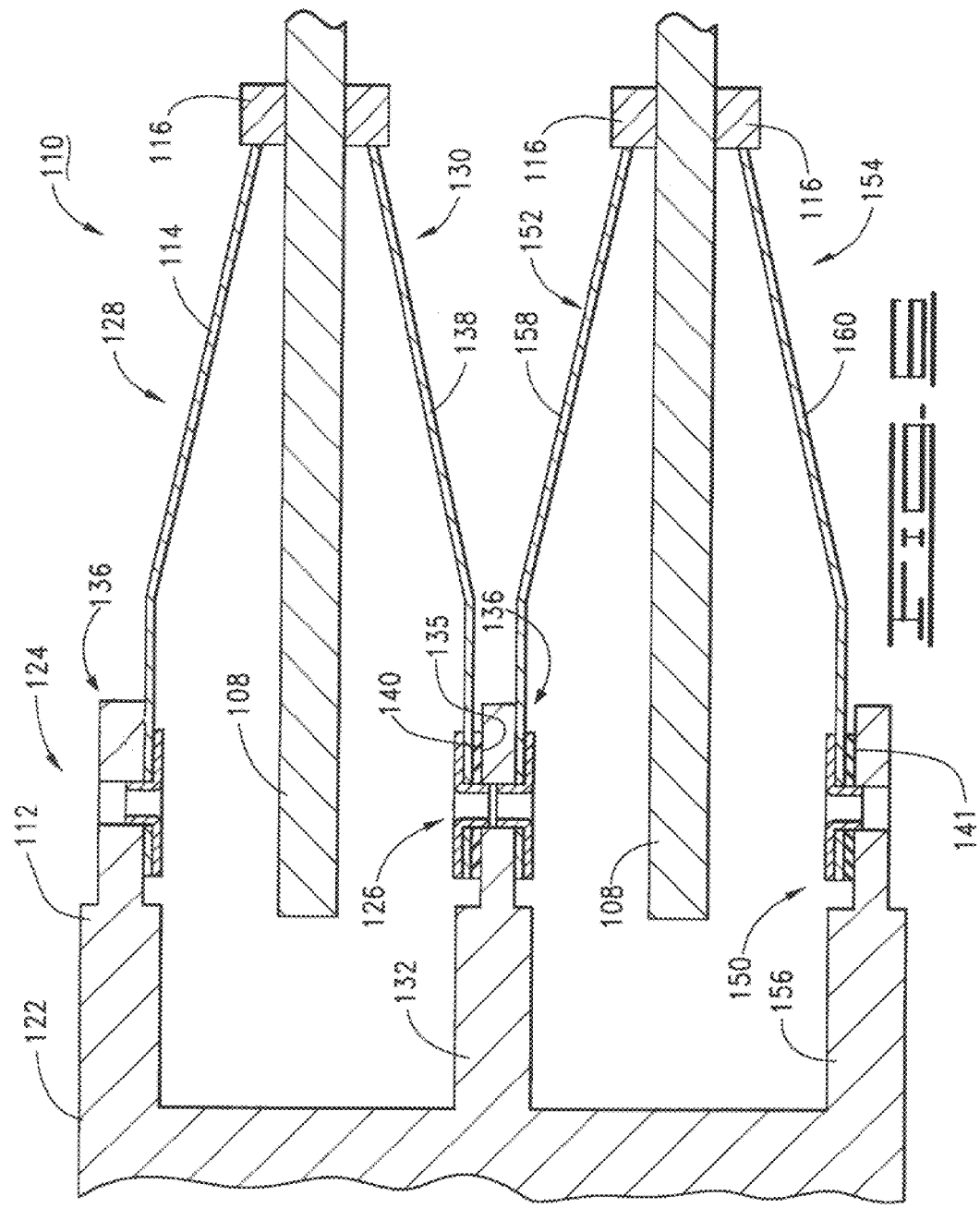

RESONANT FREQUENCY SEPARATION FOR AN ACTUATOR ASSEMBLY OF A DISC DRIVE

RELATED APPLICATIONS

This is a continuation of U.S. application Ser. No. 10/121,772, filed Apr. 11, 2002, now abandoned, that claims the benefit of U.S. Provisional Application No. 60/332,921, filed Nov. 14, 2001.

FIELD OF THE INVENTION

The claimed invention relates generally to moveable actuator systems and more particularly to actuator assemblies for disc drives.

BACKGROUND OF THE INVENTION

Data storage devices of the type known as "Winchester" disc drives are well known in the industry. These disc drives magnetically record digital data on several circular, concentric data tracks on the surfaces of one or more rigid discs. The discs are typically mounted for rotation on the hub of a spindle motor. The spindle motor is mounted to a base deck. In disc drives of the current generation, the discs are rotated at speeds of more than 10,000 revolutions per minute.

Data are recorded to and retrieved from the discs by an array of vertically aligned read/write head assemblies, or heads, which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by flexures (also called head suspensions).

A typical disc drive has an actuator assembly with more than one arm supporting a number of flexure assemblies. Any structure, such as an actuator assembly, that has several identical components can have balanced modes of vibration. A balanced mode of vibration occurs for a structure when there is no net reaction force on the structure. Because balanced modes do not have a net reaction force acting on the structure, the vibration decay rate is determined solely by the individual identical components making up the structure.

When the vibration modes of the individual components are separated in frequency and when the remainder of the structure has high damping, then there is a greater degree of damping than what is caused by each individual component. The vibration modes of the individual components can be separated in frequency by making structural changes to eliminate the balanced modes.

When the vibration modes of the individual components, such as the flexure assemblies, are close in frequency, the excitation of one of the flexure assemblies can couple to produce sympathetic motion in one of the other flexure assemblies. If this occurs, the amplitude of vibration becomes higher than it would be for only one flexure assembly. This increase in the amplitude of vibration can cause an increase in the track following error and the position error that affects the reading and writing performance. Depending on the vibration mode, the increase in the amplitude of vibration could also cause head-to-disk contact. Thus, it is highly desirable to cause the flexure assemblies to have different resonant frequencies.

One method for separating vibration modes of the individual components is to make each flexure slightly different. U.S. Pat. No. 5,953,180 issued to Frater et al. (Frater '180) presents several alternative means of differentiating head/gimbal assemblies that share a common actuator arm. Each head/gimbal assembly is made up of a flexure, a gimbal, a head, and the slider for the head. If there is sufficient damping, these alternatives that Frater '180 disclose can be effective. However, providing different head/gimbal assemblies for each actuator arm can be relatively expensive and difficult to manage in a high volume manufacturing environment.

Thus, there is a need for an improved actuator assembly that overcomes these and other limitations of the prior art.

SUMMARY OF THE INVENTION

In some embodiments an actuator assembly is provided having a bearing having a rotatable hub. A body is attached to the hub and fixed in rotation with the hub. First and second actuator arms are longitudinally cantilevered from the body and define respective first and second mounting portions at distal ends of the actuator arms. The actuator arms are identically configured except for the first mounting portion being differently mechanically configured than the second mounting portion. First and second identically configured flexure assemblies are respectively attached to the mounting portions.

In some embodiments a method is provided for forming an actuator, including steps of: positioning first and second identically configured flexure assemblies; positioning a body having longitudinally cantilevered first and second identically configured actuator arms except for different mechanically configured mounting portions at distal ends thereof, each mounting portion adapted for attaching one of the flexure assemblies; attaching each of the flexure assemblies to a respective one of the mounting portions; and affixing the body to a rotatable hub of a bearing.

In some embodiments an actuator assembly is provided having a body. First and second actuator arms are longitudinally cantilevered from the body and define respective first and second mounting portions at distal ends thereof. The actuator arms are identically configured except for the mounting portions being differently configured by different longitudinal lengths. First and second identically configured flexure assemblies are respectively attached to the mounting portions.

These and various other features as well as advantages which characterize the claimed invention will become apparent upon reading the following detailed description and upon reviewing the associated drawings.

BRIEF DESCRIPTION OF THE DRAWINGS

FIG. 3 is a partial section view of an actuator assembly constructed in accordance with preferred embodiments of the invention.

FIG. 4 is a partial section view of an actuator assembly constructed in accordance with preferred embodiments of the invention.

FIG. 5 is a partial section view of an actuator assembly constructed in accordance with preferred embodiments of the invention.

FIG. 6 is a partial section view of an actuator assembly constructed in accordance with preferred embodiments of the invention.

DETAILED DESCRIPTION

Figure 1:
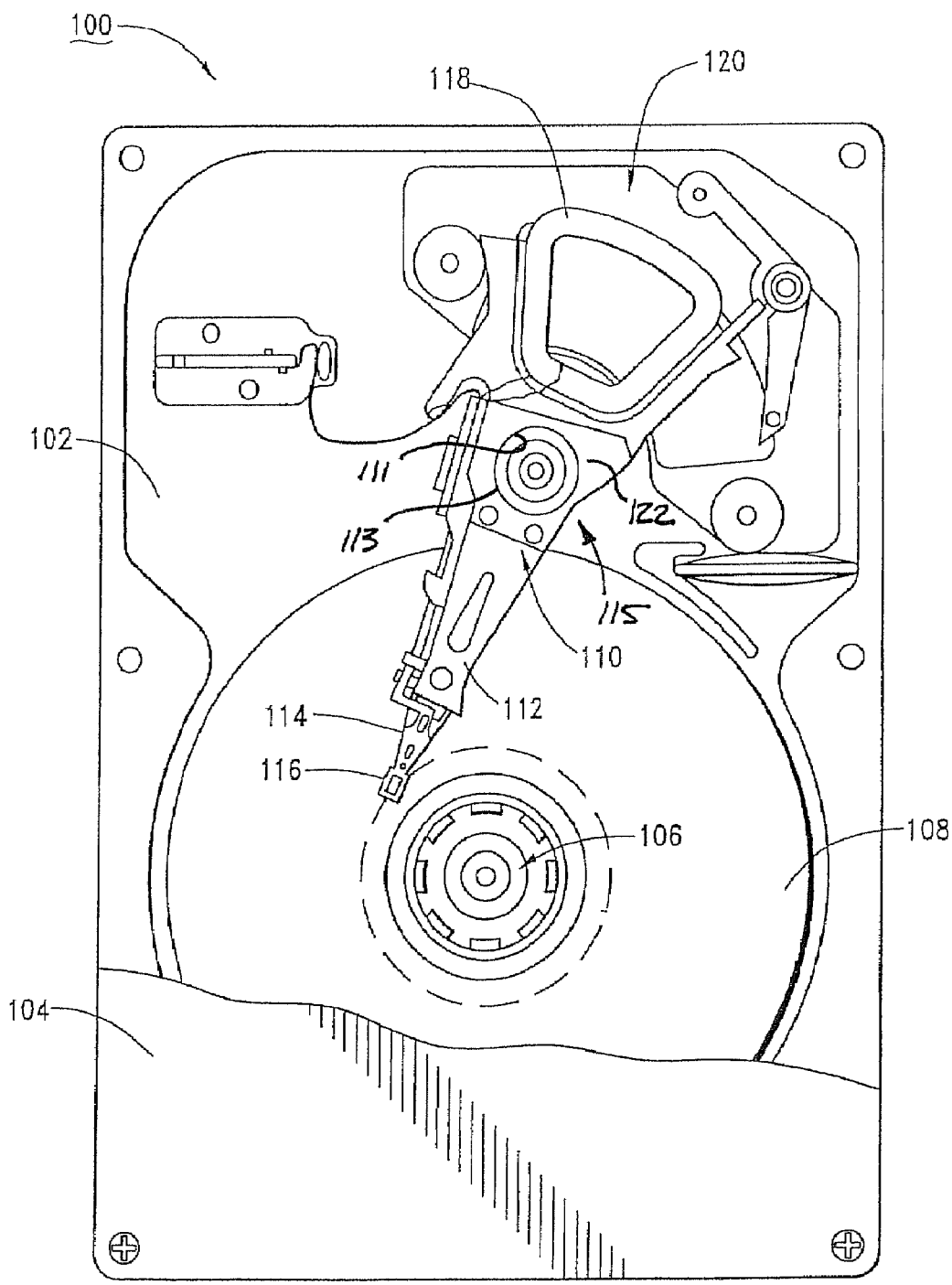
FIG. 1 is a plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor with a hub 106 rotates a number of magnetic recording discs 108 at a constant, high speed. An actuator assembly 110 includes a number of rigid actuator arms (topmost shown at 112) that extend adjacent the disc surfaces. Flexures (topmost shown at 114) extend from the actuator arms 112 to support an array of read/write heads 116. The actuator assembly 110 is pivotally journalled for rotation by having a main body 122 defining an aperture 111 that is sized to be affixed to a rotatable hub 113 of a bearing 115. The hub 113 and body 122 are fixed together in rotation through the application of current to an actuator coil 118 of a voice coil motor (VCM) 120.

Figure 2:
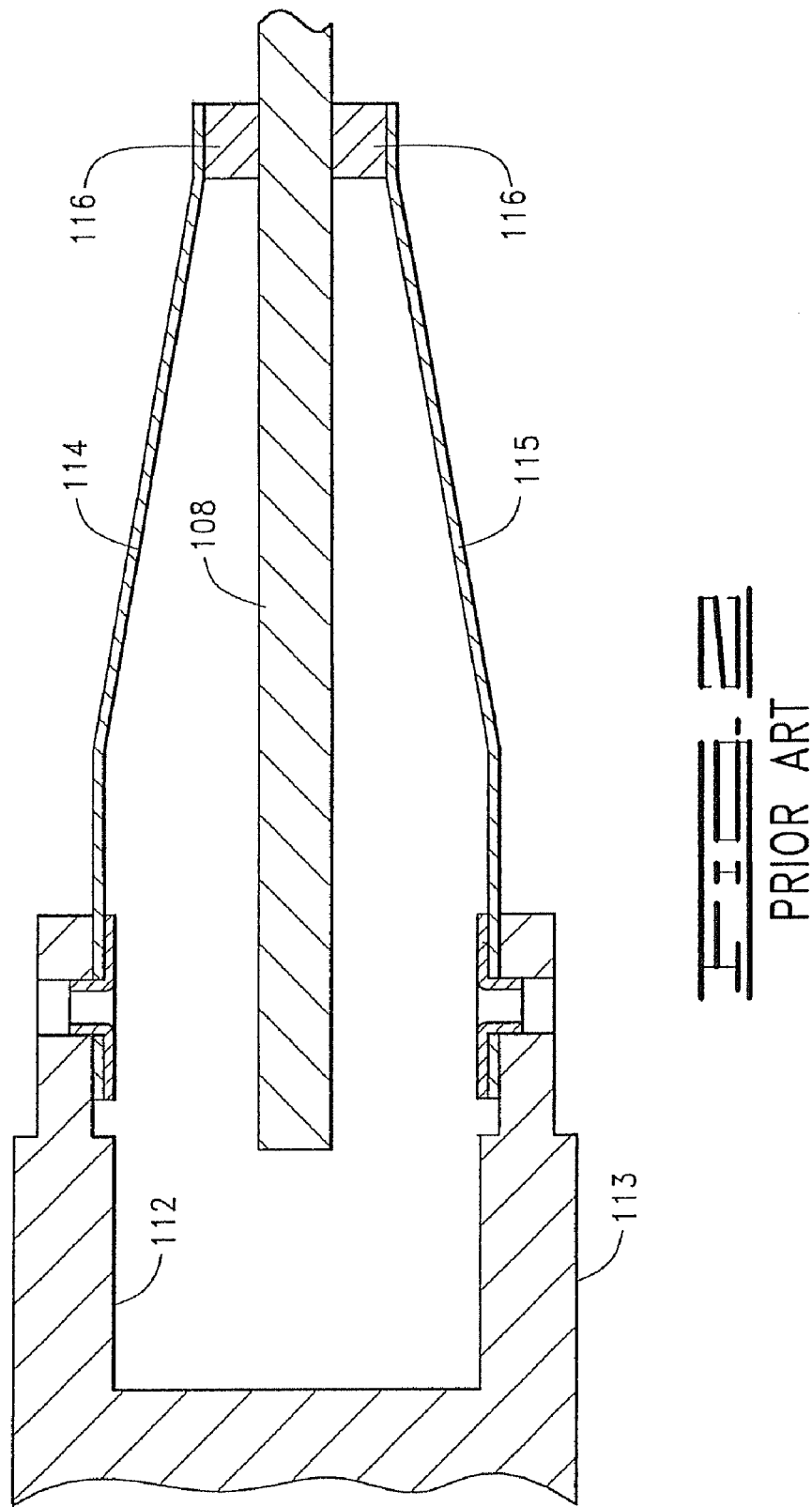
FIG. 2 is a partial, section view of an actuator assembly of the prior art.

FIG. 2 shows a partial section view of an actuator assembly 110 of the existing art. In FIG. 2, nominally identical flexures 114, 115 extend from nominally identical actuator arms 112, 113. For purposes of this description, the skilled artisan readily appreciates the term "nominally" ordinarily means that the nominal specifications are identical, such as the dimensions and material characteristics, notwithstanding any part-to-part variation that might exist such as tolerance variation and process variation. The read/write heads 116 are positioned at the end of the flexures 114, 115 to read data from the disc 108 and write data to the disc 108. The first flexure 114 is attached to the first actuator arm 112. The second flexure 115 is attached to the second actuator arm 113.

FIG. 3 shows an actuator assembly constructed in accordance with preferred embodiments of the present invention. The actuator assembly 110 includes a body 122, a first actuator arm assembly 124, a second actuator arm assembly 126, a first flexure assembly 128 and a second flexure assembly 130. The first actuator assembly 124 has a first actuator arm 112 and the second actuator arm assembly 126 has a second actuator arm 132.

The first actuator arm assembly 124 has a conventional actuator arm 112 as is commonly found in actuator arms of the existing art. The second actuator arm assembly 126 has an actuator arm 132 with a notch 134 formed in an end 136 of the second actuator arm 132 distal from the body 122. Each of the distal ends 136 of the first actuator arm assembly 124 and the second actuator arm assembly 126 has a different mechanical configuration. Because of the notch 134, a mounting area 135 of the distal end 136 for attaching the second flexure assembly 130 to the second actuator arm 132 is reduced, as compared with a mounting area 135 of the first actuator arm 114.

The first flexure assembly 128 includes a first flexure 114 and the second flexure assembly 130 includes a second flexure 138. Each of the flexure assemblies 128 and 130 also includes a head 116. Each of the flexure assemblies 128 and 130 is nominally identical to the other. Each head 116 reads data from the disc 108 or writes data to the disc 108. Each of the flexures 114 and 138 is attached to one of the actuator arms 112 and 132, respectively, by an adhesive.

The reduced mounting area 135 for attaching the second flexure 138 to the actuator arm 132 causes the second flexure assembly 130 to have mechanical resonance characteristics different from the mechanical resonance characteristics of the first flexure assembly 128. In general, the resonant frequencies of the first flexure assembly 128 are different from the resonant frequencies of the second flexure assembly 130 because of the reduced mounting area 135 for the distal end of the second actuator arm 132. In a mathematical model of the vibration of the flexure assemblies 128 and 130, this difference in mounting area 135 is modeled as different boundary conditions for the equations of motion.

FIG. 4 shows another actuator assembly 110 having a body 122, a first actuator arm assembly 124, a second actuator arm assembly 126, a first flexure assembly 128 and a second flexure assembly 130. The first actuator assembly 124 has a first actuator arm 112 and the second actuator arm assembly 126 has a second actuator arm 132. The first actuator arm 112 is a conventional actuator arm 114 as is commonly found in actuator arms of the existing art.

The second actuator arm assembly 126 includes a spacer 140 positioned between the second actuator arm 132 and the second flexure assembly 130. The spacer 140 is made from a material having a different stiffness than the stiffness of the material that forms the actuator arms 112 and 132. In a preferred embodiment, the spacer 140 is plastic and the actuator arms 112 and 132 are aluminum.

The first flexure assembly 128 includes a first flexure 114 and the second flexure assembly 130 includes a second flexure 138. Each of the flexure assemblies 128 and 130 is nominally identical to one another. Each flexure assembly 128 and 130 includes a head 116. Each of the heads 116 reads data from the disc 108 or writes data to the disc 108. Each of the flexures 114 and 138 is attached to one of the actuator arms 112 and 132, respectively, by a swage interconnection 142.

The swage interconnection 142 for the second actuator arm 132 is formed by positioning a swage boss 144 through a hole in the second flexure 138, through a void in the spacer 140 and through an opening in a distal end 136 of the second actuator arm 132. The swage boss 144 is connected to swage plate 146. When the swage boss 144 is in place, a swage ball is passed through the swage boss 144 to deform the swage boss 144 against walls of the actuator arm openings and against walls of the flexure holes. The deformation of the swage boss 144 secures the second flexure 138 to the second actuator arm 132. The swage interconnection 142 is similarly formed for the first actuator arm assembly 124, but the first actuator arm assembly 124 does not have a spacer 140.

Each of the distal ends 136 of the first actuator arm assembly 124 and the second actuator arm assembly 126 has a different mechanical configuration. The presence of the spacer 140 that has a different stiffness than the stiffness of the actuator arm material causes the second flexure assembly 130 to have mechanical resonance characteristics different from the mechanical resonance characteristics of the first flexure assembly 128. In general, the resonant frequencies of the first flexure assembly 128 are different from the resonant frequencies of the second flexure assembly 130 because of the presence of the spacer 140. In a mathematical model of the vibration of the flexure assemblies 128 and 130, this difference of having a spacer 140 for the second actuator arm assembly 126, and not the first actuator arm assembly 124, is modeled as different boundary conditions for the equations of motion.

FIG. 5 shows another actuator assembly 110 constructed in accordance with a preferred embodiment of the present invention. In FIG. 5, an actuator assembly 110 has a body 122, a first actuator arm assembly 124, a second actuator arm assembly 126, a third actuator arm assembly 150, a first flexure assembly 128, a second flexure assembly 130, a third flexure assembly 152, and a fourth flexure assembly 154. The first actuator arm assembly 124 has a first actuator arm 112, the second actuator arm assembly 126 has a second actuator arm 132, and the third actuator arm assembly 150 has a third actuator arm 156.

The first actuator arm assembly 124 has a conventional actuator arm 112 as is commonly found in actuator arms of the existing art. The second actuator arm assembly 126 has an actuator arm 132 with a reduced mounting area 135 at a distal end 136 for attaching the second flexure assembly 130 and third flexure assembly 152 to the second actuator arm 132, as compared with a mounting area 135 of the first actuator arm 114.

The third actuator arm assembly 150 includes a spacer 140 positioned between the third actuator arm 156 and the fourth flexure assembly 154. The spacer 140 is made from a material having a different stiffness than the stiffness of the material that forms the actuator arms 112, 132, 156. In a preferred embodiment, the spacer 140 is rubber and the actuator arms 112, 132, 156 are aluminum.

The first flexure assembly 128 includes a first flexure 114, the second flexure assembly 130 includes a second flexure 138, the third flexure assembly 152 includes a third flexure 158, and the fourth actuator assembly 154 includes a fourth flexure 160. Each of the flexure assemblies 128, 130, 152, 154 also includes a head 116. Each head 116 reads data from the discs 108 or writes data to the discs 108. Each of the flexures 114, 138, 158, 160 is attached to the actuator arms 112, 132, 156 respectively, by a swage interconnection, as described above for FIG. 4. Each flexure assembly 128, 130, 152, 154 is nominally identical.

FIG. 6 shows another actuator assembly 110 constructed in accordance with a preferred embodiment of the present invention. In FIG. 6, an actuator assembly 110 has a body 122, a first actuator arm assembly 124, a second actuator arm assembly 126, a third actuator arm assembly 150, a first flexure assembly 128, a second flexure assembly 130, a third flexure assembly 152, and a fourth flexure assembly 154. The first actuator arm assembly 124 has a first actuator arm 112, the second actuator arm assembly 126 has a second actuator arm 132, and the third actuator arm assembly 150 has a third actuator arm 156.

The first actuator arm assembly 124 has a conventional actuator arm 112 as is commonly found in actuator arms of the existing art.

The second actuator arm assembly 126 has a second actuator arm 132 with a spacer 140 positioned between the top side of the second actuator arm 132 and the second flexure 138. The spacer 140 is made from a material having a different stiffness than the stiffness of the material that forms the actuator arms 112, 132, 156. A bottom side of the second actuator arm assembly 126 is configured as a conventional actuator arm of the existing art for attaching the third flexure assembly 152 to the bottom side of the second actuator arm 132.

The third actuator arm assembly 150 includes a spacer 141 positioned between the third actuator arm 156 and the fourth flexure assembly 154. The spacer 141 is made from a material having a different stiffness than the stiffness of the material that forms the actuator arms 112, 132, 156. In a preferred embodiment, the spacer 140 is rubber, the spacer 141 is plastic and the actuator arms 112, 132, 156 are aluminum.

The first flexure assembly 128 includes a first flexure 114, the second flexure assembly 130 includes a second flexure 138, the third flexure assembly 152 includes a third flexure 158, and the fourth flexure assembly 154 includes a fourth flexure 160. Each of the flexure assemblies 128, 130, 152, 154 also includes a head 116. Each head 116 reads data from the discs 108 or writes data to the discs 108. Each of the flexures 114, 138, 158, 160 is attached to the actuator arms 112, 132, 156 respectively, by a swage interconnection, as described above for FIG. 4. Each flexure assembly 128, 130, 152, 154 is nominally identical.

For the embodiments shown in FIGS. 5 and 6, each of the flexure assemblies 128, 130, 152, 154 generally has different vibration and mechanical resonance characteristics. If one wished to add more actuator arms, one could provide another actuator assembly with a spacer having a different stiffness than the spacers 140, 141 used for the second and third actuator assemblies 126, 150. Alternatively, one could provide an actuator assembly such as comprising the second actuator arm assembly 126 having a different size mounting area 135.

Accordingly, an actuator assembly (such as 110) is provided that includes a body (such as 122), a first actuator arm assembly (such as 124), a second actuator arm assembly (such as 126), a first flexure assembly (such as 128), and a second flexure assembly (such as 130). Each of the first and second actuator arm assemblies projects from the body portion and has a distal end (such as 136) with different respective first and second mechanical configurations, sometimes referred to herein as "mounting configurations." Each of the flexure assemblies is respectively mounted to the distal ends of the first and second actuator arm assemblies via the respective mounting configuration. The first and second mechanical configurations (mounting configurations) are selected to provide the first and second flexure assemblies with different mechanical resonance characteristics.

In a preferred embodiment, the second actuator arm assembly includes an actuator arm and a spacer (such as 140) disposed between the actuator arm and the second flexure assembly. The spacer has a stiffness different from the stiffness of the actuator arm.

In another preferred embodiment, the first actuator arm assembly includes a first actuator arm having a first mounting area (such as 135) to which the first flexure assembly is affixed. The second actuator arm assembly has a second mounting area to which the second flexure assembly is affixed. The second mounting area is smaller than the first mounting area. In this preferred embodiment, a notch (such as 134) may be formed in the second actuator arm to define the second mounting area. For all embodiments, the flexure assemblies are nominally identical.

In yet another preferred embodiment, the actuator assembly is used in a disc drive (such as 100). In this embodiment, each flexure assembly includes a flexure (such as 114, 138) and a head (such as 116). The head writes data to and reads data from a disc (such as 108). For all embodiments, the flexure assemblies are nominally identical.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the actuator assembly without departing from the spirit and scope of the present invention.

The claims below include steps for mounting a flexure to an actuator arm. Although the steps are listed in a particular order, this does not mean that the steps must be carried out in the order the steps are listed. The only order that may be inferred from the claims is for the steps that must be accomplished before other steps can be accomplished.

In addition, although the embodiments described herein are directed to an actuator assembly for a disc drive, it will be appreciated by those skilled in the art that the actuator assembly can be used for other devices without departing from the scope of the claimed invention.

What is claimed:

1. An actuator assembly, comprising:
    a bearing having a rotatable hub;
    a body attached to the hub and fixed in rotation with the hub;
    first and second actuator arms longitudinally cantilevered from the body and having respective first and second mounting configurations at distal ends of the actuator arms, the actuator arms identically configured except for the first mounting configuration being differently mechanically configured than the second mounting configuration; and
    first and second identically configured flexure assemblies respectively mounted to the actuator arms via the first and second mounting configurations, the first and second mounting configurations producing different operable resonance responses in the respective first and second flexure assemblies.

2. The actuator assembly of claim 1 wherein at least one of the first and second mounting configurations comprises a spacer disposed between the actuator arm and the respective flexure assembly.

3. The actuator assembly of claim 2 wherein the spacer comprises a characteristic material stiffness, and the actuator arms comprise a different characteristic material stillness.

4. The actuator assembly of claim 2 wherein a combined thickness of one of the actuator arms and flexure assembly with the spacer is identical to a combined thickness of another one of the actuator arms and flexure assembly without the spacer.

5. The actuator assembly of claim 2 wherein one of the first or second flexure assemblies is attached to one side of one of the actuator arms and a third flexure assembly is attached to an opposing side of the same actuator arm.

6. The actuator assembly of claim 1 wherein the first and second mounting configurations comprise members having surfaces to which the respective flexure assembly is attached, the surfaces being of different longitudinal lengths depending from each of the identically configured portions of the actuator arms.

7. The actuator assembly of claim 1 wherein the first and second mounting configurations comprise members to which the respective flexure assembly is attached, the members having different lateral thicknesses depending from each of the identically configured portions of the actuator arms.

8. The actuator assembly of claim 1, wherein the first and second mounting configurations comprise swage interconnections mounting the flexure assemblies to the actuator arms.

9. The actuator assembly of claim 1, wherein the first and second mounting configurations comprise adhesive mounting the flexure assemblies to the actuator arms.

10. A method for forming an actuator, comprising:
    positioning first and second identically configured flexure assemblies;
    positioning a body having longitudinally cantilevered first and second identically configured actuator arms except for having different mechanically configured mounting configurations supported at distal ends thereof, each mounting configuration adapted for mounting one of the flexure assemblies;
    mounting each of the flexure assemblies to one of the actuator arms via a respective one of the mounting configurations; and
    affixing the body to a rotatable hub of a bearing.

11. The method of claim 10, wherein the positioning a body step is characterized by the different mechanically configured mounting configurations including differently sized members depending respectively from the identically configured portions of the actuator arms to which the flexure assemblies are mounted.

12. The method of claim 10, wherein the mounting step comprises interposing a spacer between one of the actuator arms and the respective flexure assembly.

13. The method of claim 11 wherein the positioning a body is characterized by the differently sized members having different longitudinal lengths.

14. An actuator assembly, comprising:
    a body;
    first and second actuator arms longitudinally cantilevered from the body and defining respective first and second mounting areas at distal ends thereof, the actuator arms being identically configured except for the mounting areas being differently configured by different longitudinal lengths; and
    first and second identically configured flexure assemblies respectively attached to the mounting areas.

15. The actuator assembly of claim 14 wherein the mounting areas are configured differently to produce predetermined different characteristic resonance responses.

16. The actuator assembly of claim 14 wherein adhesive is used to attach the flexure assemblies to the mounting areas.

* * * * *